US007233944B2

(12) United States Patent
Ahmed (10) Patent No.: US 7,233,944 B2
(45) Date of Patent: Jun. 19, 2007

(54) DETERMINING QUERY COST BASED ON SUBQUERY FILTERING FACTOR

(75) Inventor: Rafi Ahmed, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 441 days.

(21) Appl. No.: 10/900,788

(22) Filed: Jul. 27, 2004

(65) Prior Publication Data

US 2006/0026133 A1 Feb. 2, 2006

(51) Int. Cl.
*G06F 17/30* (2006.01)

(52) U.S. Cl. .................. 707/3; 707/1; 707/2; 707/4

(58) Field of Classification Search ............... None
See application file for complete search history.

(56) References Cited

U.S. PATENT DOCUMENTS

| 5,822,748 | A | 10/1998 | Cohen et al. |
| 2005/0283471 | A1 | 12/2005 | Ahmed |
| 2006/0026133 | A1 | 2/2006 | Ahmed |

OTHER PUBLICATIONS

George Lumpkin, Hakan Jakobsson, "Query Optimization in Oracle 9i", Oracle Corporation, Oracle White Paper, Feb. 2002, pp. 1-30.

Hamid Pirahesh, Joseph M. Hellerstein, Waqar Hasan, "Extensible/Rule Base Query Rewrite Optimization in Starbust", IBM Almaden Research Center, Jun. 1992. pp. 1-10.

Umeshwar Dayal, "Of Nests and Trees: A Unified Approach to Processing Queries That Contain Nested Subqueries, Aggregates and Quantifiers", Proceedings of the 13th VLDB Conference, Brighton 1987, pp. 197-208.

P. Griffiths Selinger, M.M. Astrahan, D.D. Chamberlin, R.A. Lorie, T.G. Price, "Access Path Selection in a Relational Database Management System", Proceedings of the 1979 ACM SIGMOD International Conference on the Management of Data, 1979, pp. 23-34.

*Primary Examiner*—Charles Rones
*Assistant Examiner*—Belix M. Ortiz
(74) *Attorney, Agent, or Firm*—Hickman Palermo Truong & Becker LLP

(57) ABSTRACT

Techniques are provided for determining query cost for a query that include an outer query and at least a first subquery. The techniques include determining a filtering factor for the first subquery based on a first cardinality and a second cardinality. The first cardinality is determined based on a first set of query blocks in the query. The second cardinality is determined based on a second set of query blocks. The first set of query blocks includes the outer query and zero or more subqueries from the query and does not include the first subquery. The second set of query blocks includes all the query blocks in the first set of query blocks and, in addition, the first subquery. The techniques also include determining a cost for the query based, at least, on the filtering factor for the first subquery.

24 Claims, 4 Drawing Sheets

DETERMINING QUERY COST BASED ON SUBQUERY FILTERING FACTOR

RELATED APPLICATIONS

This application is related to U.S. patent Ser. No. 10/874,400, entitled "Multi-tier Query Processing", filed by Rafi Ahmed on Jun. 22, 2004, the contents of which are herein incorporated by reference for all purposes as if originally set forth herein, referred to herein as to '2465.

This application is related to U.S. patent application Ser. No. 10/901,272, entitled "Reusing Optimized Query Blocks In Query Processing", filed by Rafi Ahmed on Jul. 27, 2004, the contents of which are herein incorporated by reference for all purposes as if originally set forth herein, referred to herein as to '2467.

This application is related to U.S. patent application Ser. No. 10/920,973, entitled "Selecting Candidate Queries", filed by Rafi Ahmed on Aug. 17, 2004, the contents of which are herein incorporated by reference for all purposes as if originally set forth herein, referred to herein as to '2469.

FIELD OF THE INVENTION

The present invention relates to query processing. The invention relates more specifically to determining query cost based on a subquery filtering factor.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Relational database management systems store information in tables, where each piece of data is stored at a particular row and column. Information in a given row generally is associated with a particular object, and information in a given column generally relates to a particular category of information. For example, each row of a table may correspond to a particular employee, and the various columns of the table may correspond to employee names, employee social security numbers, and employee salaries.

A user retrieves information from and submits updates to a database by interacting with a database application. The user's actions are converted into a query by the database application. The database application submits the query to a database server. The database server responds to the query by accessing the tables specified in the query to determine which information stored in the tables satisfies the queries. The information that satisfies the queries is retrieved by the database server and transmitted to the client application. Alternatively, a user may request information directly from the database server by constructing and submitting a query directly to the database server using a command line or graphical interface.

Queries submitted to the database server must conform to the rules of a particular query language. One popular query language, known as the Structured Query Language (SQL), provides users a variety of ways to specify information to be retrieved. In SQL and other query languages, queries may include inner query blocks. For example, the query

```
SELECT T1.x
FROM table1 T1, parts P
WHERE P.y = T1.y AND P.z = 'MED BOX'
    AND T1.quantity < (SELECT AVG (T2.quantity)
        FROM Table2 T2
        WHERE T2.partkey = P.partkey)
    AND P.quantity < (SELECT AVG (T3.quantity)
        FROM Table3 T3
        WHERE T3.serialnum = T1.serialnum);
``` has an outer query block that has two inner query blocks, each of which is a subquery:

SELECT AVG (T2.quantity) FROM Table2 T2 WHERE T2.partkey=P.partkey and

SELECT AVG (T3.quantity) FROM Table3 T3 WHERE T3.serialnum=T1.serialnum.

Determining costs for queries with multiple subqueries is difficult. The difficulty arises because each subquery reduces or "filters" the number of rows on which subsequent subqueries will be applied. The total cost of applying a subquery is a function of the number of rows to which the subquery is applied. That is, even if a cost "function" can be determined for each subquery, if it is not known on how many rows the subquery will be applied, then the cost of the subquery in the context of the query cannot be determined.

An approach to estimating the cost of a subquery is the heuristic approach. In the heuristic approach, a set of rules, or "heuristics," are applied to the subqueries and the data on which the subqueries will be applied. The heuristics estimate the number of rows that will be "filtered" by the subquery. The estimate is used to estimate the cost for subsequent subqueries. Heuristics are again be used on the subsequent subqueries to determine how many rows each of the subsequent subqueries will filter. A problem with this approach is that the heuristic-based estimate of row filtering are made based on general rules which may not be applicable to the particular query, its subqueries, or the data to which the query is being applied. Therefore, there will be error involved with each heuristic estimation of subquery filtering, and these errors will propagate, build upon one another, and may even cause exponential increases in error.

Based on the discussion above, there is clearly a need for techniques that overcome the shortfalls of the approaches discussed above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques for determining query cost based on a subquery filtering factor are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Introduction

Herein are described techniques that may be used to help determine the costs for semantically equivalent versions of a query. For example, consider a query that includes an outer query and two nested subqueries. There are numerous semantic equivalents to that query, including those queries with both subqueries unnested, one of the two subqueries unnested and the other nested (in its original form), and with both subqueries nested. Subquery unnesting is described below in the section entitled Subquery Unnesting.

Techniques exist for determining the cost of the query with both subqueries unnested. In subquery unnesting, either the subquery block may be merged into the containing query block or the subquery may be transformed into an inline view thereby converting the subquery filter into join.

When one of the two subqueries is unnested and the other remains nested, the interim cost and cardinality for the outer query with one of the subqueries unnested can be determined, and the additional cost for the nested subquery can be determined based on the interim cardinality. Example techniques for determining cost are described in the section entitled Estimating the Cost of the Query.

When two or more subqueries remain nested, however, it is difficult to determine the cost for the query as a whole. For the case when there are two subqueries and they remain nested, the interim cost and interim cardinality can be determined for the outer query without taking into account the processing of the subqueries. The interim cardinality can be used as an input cardinality for the first subquery processed and therefore, the additional cost of the first subquery can be determined. However, the cardinality after the first subquery is processed is unknown, and, therefore, the additional cost associated with processing the second nested subquery cannot be determined accurately, since its input cardinality is unknown.

In general, each subquery in a query acts as a "filter" on the results and reduces the number of rows to which subsequent subqueries are applied. As a result, the input cardinality is lower for each subsequent subquery. The ratio by which a subquery reduces the input cardinality is called the "filtering factor". As noted above, it is difficult to estimate the reduction in cardinality of a nested subquery based on the subquery itself. Therefore, it is difficult to estimate the input cardinality for subsequent subqueries, and as a result, it is difficult to estimate the cost of semantically equivalent queries that contain multiple nested subqueries.

The techniques described herein, however, resolve this problem by providing an estimate of the filtering factor for a subquery. The filtering factor for a particular subquery is determined based on the ratio of the cardinality without the particular subquery being processed (the first cardinality) and the cardinality with that subquery unnested into the outer query (the second cardinality). The filtering factor may be computed as a ratio of the second cardinality and the first cardinality. Since the results of applying the particular subquery, and therefore the post-application cardinality, are the same whether the subquery is unnested or it remains nested, the filtering factor determined for an unnested subquery may be used to estimate the post-application cardinality even when the particular subquery is nested. That is, the filtering factor determined for the unnested subquery may be used to estimate the input cardinalities for subqueries processed after the particular subquery, even when the particular subquery remains nested. For example, the cardinality after a particular subquery is applied may be estimated as the product of the filtering factor for the subquery and the input cardinality for the subquery. These techniques enable the determination of the "input cardinality" for each of the subqueries and, therefore, also enable the determination of costs for the semantically equivalent forms of the query in which two or more subqueries are nested.

In the examples used herein, the queries each have two subqueries and the filtering factor for one of the two subqueries is determined. However, the techniques apply when there are N (where N>1) subqueries and the filtering factor is determined for at least M−1 of those subqueries in order to determine the cost of a query with all M subqueries nested (where N>=M>1) in an equivalent form of the query.

Structural Overview

Figure 1:
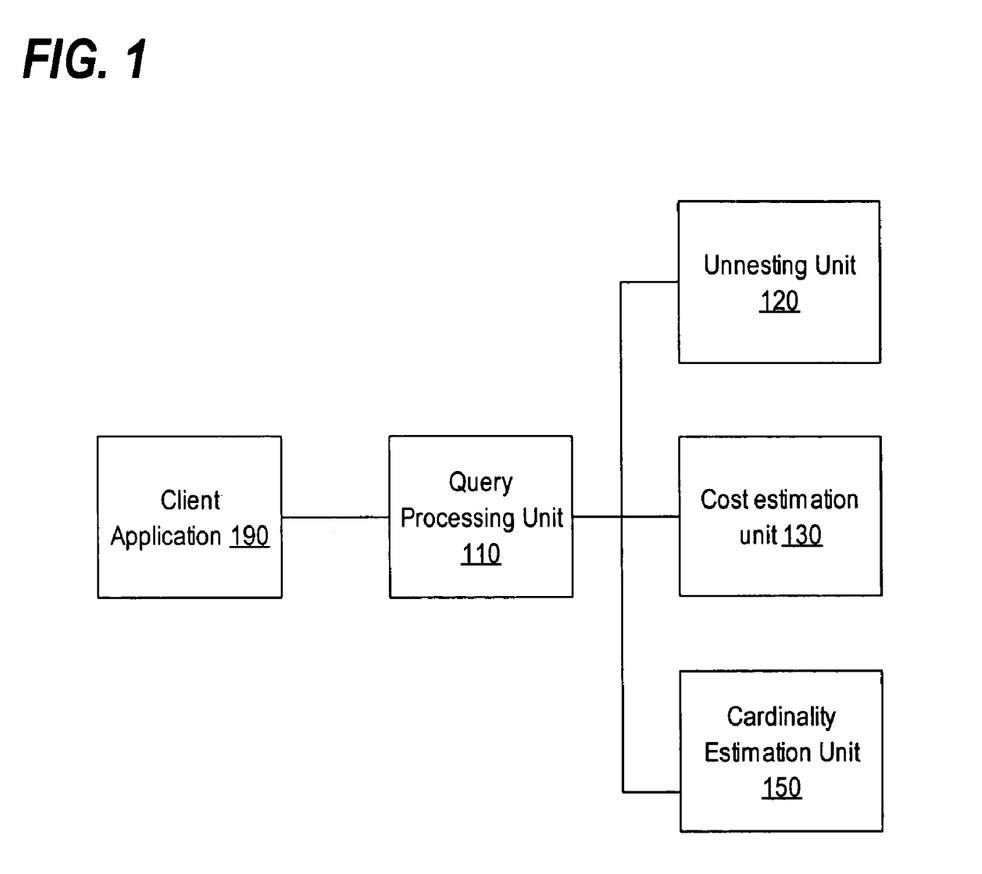
FIG. 1 is a block diagram that depicts a system for interleaved cost-based subquery unnesting and view merge transformations.

FIG. 1 is a block diagram that depicts a system for interleaved cost-based subquery unnesting and view merge transformations.

FIG. 1 depicts five logical machines: a query processing unit 110, an unnesting unit 120, a cost estimation unit 130, a cardinality estimation unit 150, and a client application 190. Each logical machine may run on separate physical computing machines or may be running on the same physical computing machine as one or more of the other logical machines. Various embodiments of computers and other physical and logical machines are described in detail below in the section entitled Hardware Overview.

The query processing unit 110 is communicatively coupled to the unnesting unit 120, the cost estimation unit 130, the cardinality estimation unit 150, and the client application. In various embodiments, each of the unnesting unit 120, cost estimation unit 130, and the cardinality estimation unit 150 may also each be communicatively coupled to one or more of each of the other two units 120, 130, and 150. In various embodiments, coupling is accomplished by optical, infrared, or radio signal transmission, direct cabling, wireless networking, local area networks (LANs), wide area networks (WANs), wireless local area networks (WLANs), the Internet, or any appropriate communication mechanism.

In the example herein, the unnesting unit 120 provides, for a particular query that contains a subquery, an output query with the subquery unnested. The cost estimation unit 130 estimates the time or central processing unit (CPU) costs for an input query. The cardinality estimation unit 150 estimates the number of rows that will be left after a query or subquery has been processed. The query processing unit 110 uses the unnesting unit 120, the cost estimation unit 130, and the cardinality estimation unit 150 to process queries that have one or more subqueries.

In one embodiment, each of the query processing unit 110, the unnesting unit 120, the cost estimation unit, and the cardinality estimation unit 150 runs as part of a database server. The database may be a single node or multiple node database server and may be an object-oriented database server, a relational database server, or any other structured data server.

The client application 190 may be a client program communicatively coupled to a database server comprising the query processing unit 110, the unnesting unit 120, the cost estimation unit 130, and the cardinality estimation unit 150 or may be coupled directly to the query processing unit 110. In one embodiment, the client application 190 is a database application. The client application 190 may include machine executable instructions which, when executed by one or more processors, cause the application to transmit one or more queries to and receive results from the query processing unit 110.

Estimating Query Cost

There are numerous methods for estimating the cost of a query. The techniques described herein are in no way limited to any particular type or types of estimation methods. Example techniques for estimating query costs are described in (1) "Access Path Selection in a Relational Database Management System" P. G. Selinger, et al., ACM SIGMOD, 1979; (2) "Database System Implementation", H. Garcia-Molina, et al., Prentice Hall, 2000; and (3) "Query Evaluation Techniques for Large Databases", G. Graefe, ACM Computing Surveys, 1993. Other methods for estimating the cost of queries are described in '2465, '2467, and '2469.

Subquery Unnesting Transformation

Subquery unnesting may include determining a semantically equivalent version of a query in which the filtering of data produced by one or more subqueries within the query is effectively produced by introducing additional SQL join terms in the outer query. Generally, unnesting involves transformation in which (1) the subquery block is merged into the containing query block of the subquery or (2) the subquery is converted into an inline view. For example, some SQL IN or SQL ANY subqueries may be unnested by converting the subquery into an inline DISTINCT view or into an inline GROUP BY view. For a specific example, in the query listed in the section entitled Background, unnesting the subquery may result in:

```
SELECT L1.1_extendedprice
FROM lineitem L1, parts P,
  (SELECT AVG(L2.1_quantity) AS LAVG, L2.1_partkey AS L_PKEY
  FROM lineitem L2
  GROUP BY L2.1_partkey) V
WHERE P.p_partkey = L1.1_partkey AND P.p_container =
'MED BOX'
  AND P.p_partkey = V.L_PKEY AND and L1.1_quantity < V.LAVG;
```

The techniques described herein are in no way limited to any particular type or types of unnesting methods. Various embodiments of unnesting techniques are given in (1) "Of Nests and Trees: A Unified Approach to Processing Queries that Contain Nested Subqueries, Aggregates and Quantifiers", U. Dayal, 13th VLDB Conf. 1987; and (2) "Extensible/Rule Based Query Rewrite Optimization in Starburst", Pirahesh, et al., ACM SIGMOD, 1992.

Estimating Cardinality

The cardinality of a query or query block, in the context of a particular set of data, is the number of rows that remain after the query or query block is applied to the data. For example, if a query is executed on a database and the result is ten rows, then the cardinality of the query is ten rows.

As part of estimating the cost of queries, it may be necessary to estimate the cardinality of the query or of inner query blocks within the query. In general, estimating the cardinality of a query or inner query block depends on the query itself and certain statistical measures of the data on which the query is being executed. For example, when joining table T1 to table T2 for those rows in which T1.a=T2.b, the cardinality of the result of the join may be estimated as:

$$\text{Cardinality } (T1 \text{ Join } T2 \text{ on } T1.a=T2.b) = \text{Cardinality} \\ (T1)*\text{Cardinality}(T2)/\text{MAX}(NDV(T1.a), NDV \\ (T2.b))$$

where Cardinality(T) is the number of rows in table T, MAX(X, Y) represents the maximum of the two variables X and Y, and NDV(T, a) represents the number of distinct values in column "a" in table T.

The techniques described herein are in no way limited to a particular cardinality estimation technique. Other example methods of determining cardinality are described in H. Garcia-Molina, et al, "Database System Implementation", Prentice-Hall, 2000.

Candidate Selection Techniques

When considering multiple semantically equivalent queries, a number of different candidate selection techniques may be used to determine for which queries, of all possible semantically equivalent queries, to determine costs. One such candidate selection technique is the "exhaustive selection" technique. In the exhaustive selection technique, all candidates that can be generated by the query processing unit 110 are selected for cost determination. Costs are determined for each of the semantically equivalent queries generated in the exhaustive selection technique, and, thereby, the semantically equivalent query with the overall lowest cost may be selected for storage and/or execution. Other candidate selection techniques are "linear selection" technique and "iterative selection" technique, where fewer than all of the possible semantically equivalent queries are selected for cost determination. Linear and iterative selection techniques are described in more detail in '2469.

Functional Overview

Figure 2:
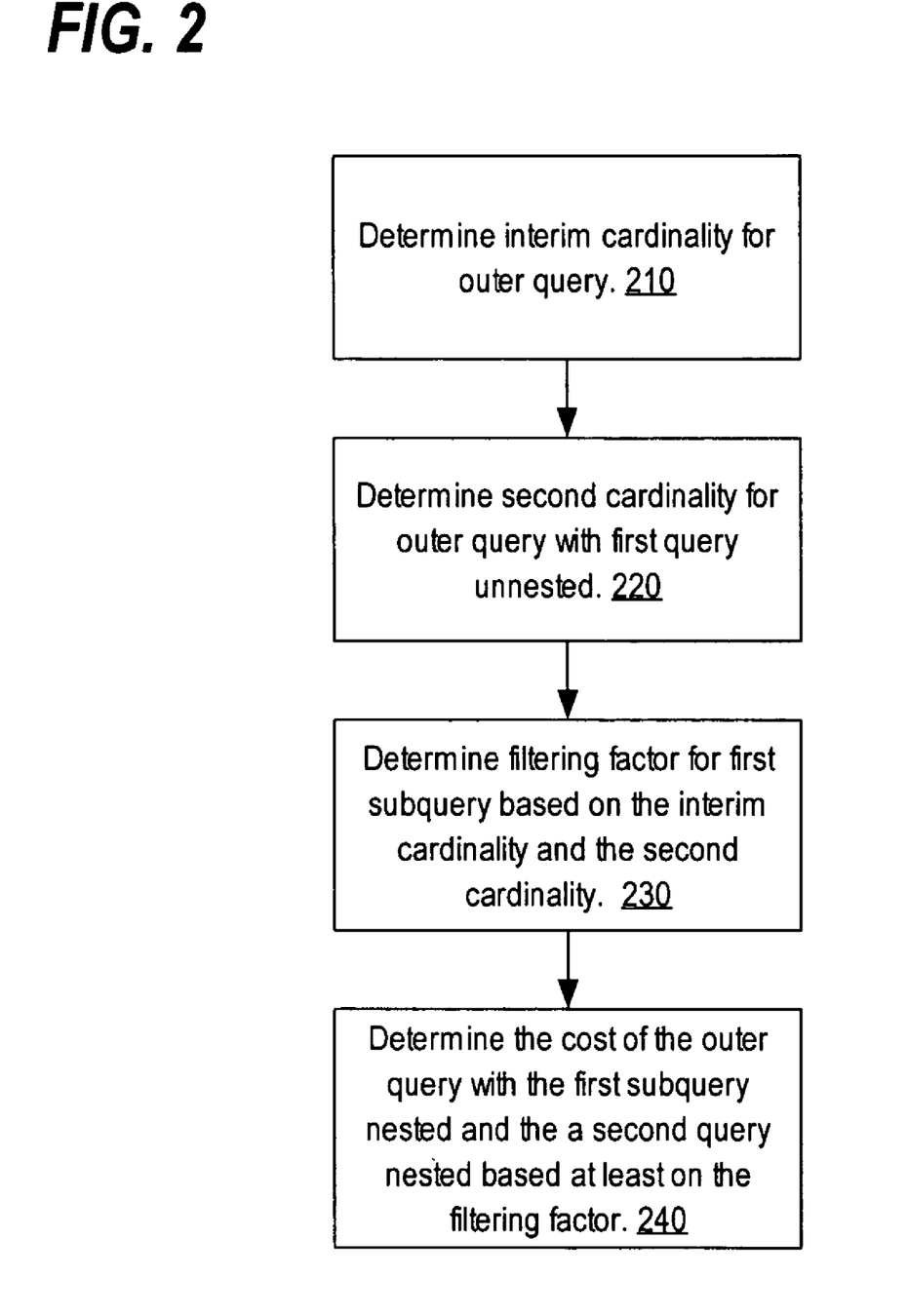
FIG. 2 is a flow diagram that depicts a process for determining the cost for a semantically equivalent query based at least in part on a filtering factor.

FIG. 2 is a flow diagram that depicts a process for determining the cost for a semantically equivalent query based at least in part on a filtering factor.

In the example used herein, it will be assumed that the original query contains an outer query, a first subquery, and a second subquery. It will also be assumed that the process is performed by the system depicted in FIG. 1.

In step 210, the query processing unit 110 causes the cardinality estimation unit 150 to estimate an interim cardinality of the outer query with the second subquery unnested into the outer query and without processing the first subquery, herein referred to as the "first cardinality". In order to perform this step, it may be necessary for the query processing unit 110 to cause the unnesting unit 120 to unnest the second subquery into the outer query. In other cases, the unnesting operation may have already been performed and the query with the first subquery unnested may be retrieved from a machine-readable medium. In any of these cases, once the outer query with the second subquery unnested is determined or retrieved, techniques such as those described in the section entitled Estimating Cardinality may be used to estimate the cardinality.

In step 220, the query processing unit 110 causes the cardinality estimation unit 150 to estimate a final cardinality for the outer query by unnesting both the subqueries, referred to herein as the "second cardinality".

Alternatively, in step 210, the query processing unit 110 causes a cardinality estimation unit 150 to estimate the first cardinality as the interim cardinality of the outer query without processing the first subquery or the second subquery. Step 220 may then include the query processing unit 110 causing the cardinality estimation unit 150 to estimate the second cardinality as the interim cardinality for the outer query with the first subquery unnested (without processing the second subquery).

In step 230, the query processing unit 110 determines a filtering factor for the first subquery based on the ratio of the second cardinality and the first cardinality. The "filtering factor" is an estimate of the ratio of the number of rows that will remain after the first subquery is applied as compared to the number of rows that existed in the result set before the first subquery is applied. For example, if the first subquery is applied to one thousand rows (the first cardinality) of data, and after applying the first subquery, there are one hundred rows (the second cardinality) remaining, then the filtering factor for the first subquery may be one hundred divided by one thousand or one tenth (0.1).

Numerous possible equations exist for determining the filtering factor for a subquery. Since the cardinalities are estimated and are not, generally speaking, exact, the choice of filtering factor equation may depend on the cardinality estimation technique used or on the data to which the query is being applied. For example, if it is known that the cardinality estimation for the interim cardinality is usually overestimated and that the second cardinality is generally underestimated, then it may be beneficial to use a filtering factor equation that takes this knowledge into account.

In step 240, the query processing unit 110 determines the cost of the query with the outer query, and the first and second subqueries nested based at least in part on the filtering factors. From the steps above, the query processing unit 110 already has the interim cardinality and the filtering factor of the first subquery. The query processing unit 110 may pass the query with the outer query and the first and second subqueries nested, the filtering factor, and the interim cardinality to the cost estimation unit 130. The cost estimation unit 130 may then determine the cost of the query based on any appropriate equation that contains the filtering factor. For example, one equation that may be used to determine the cost of the query where the first and second subqueries remain nested would be:

cost of query=(interim cost of outer query)+(interim cardinality)*(cost of first subquery)+(interim cardinality)*(filtering factor for the first subquery)*(cost of the second subquery).

In other embodiments other equations may be used. Various embodiments of determining costs for the outer query and the subqueries are described above in the section entitled Estimating Query and Query Block Cost.

In the example given above, numerous specific details were provided to describe a subset of available embodiments. In general the techniques described herein are not limited to these specific details. For example, the steps in FIG. 2 were described as being executed by the query processing unit 110 with interaction with the unnesting unit 120, the cost estimation unit 130, and the cardinality estimation unit 150. In general, the steps of FIG. 2 may be performed by any appropriate process, or machine executing instructions and any or all of the steps may also be performed by the unnesting unit 120, the cost estimation unit 130, or the cardinality estimation unit 150.

Various techniques described with respect to FIG. 2 provide a mechanism for determining a filtering factor for a subquery and, subsequently, for determining the cost of a query with the subquery unnested based on the filtering factor. These techniques may provide better cost estimations for multiple, semantically equivalent queries.

Figure 3:
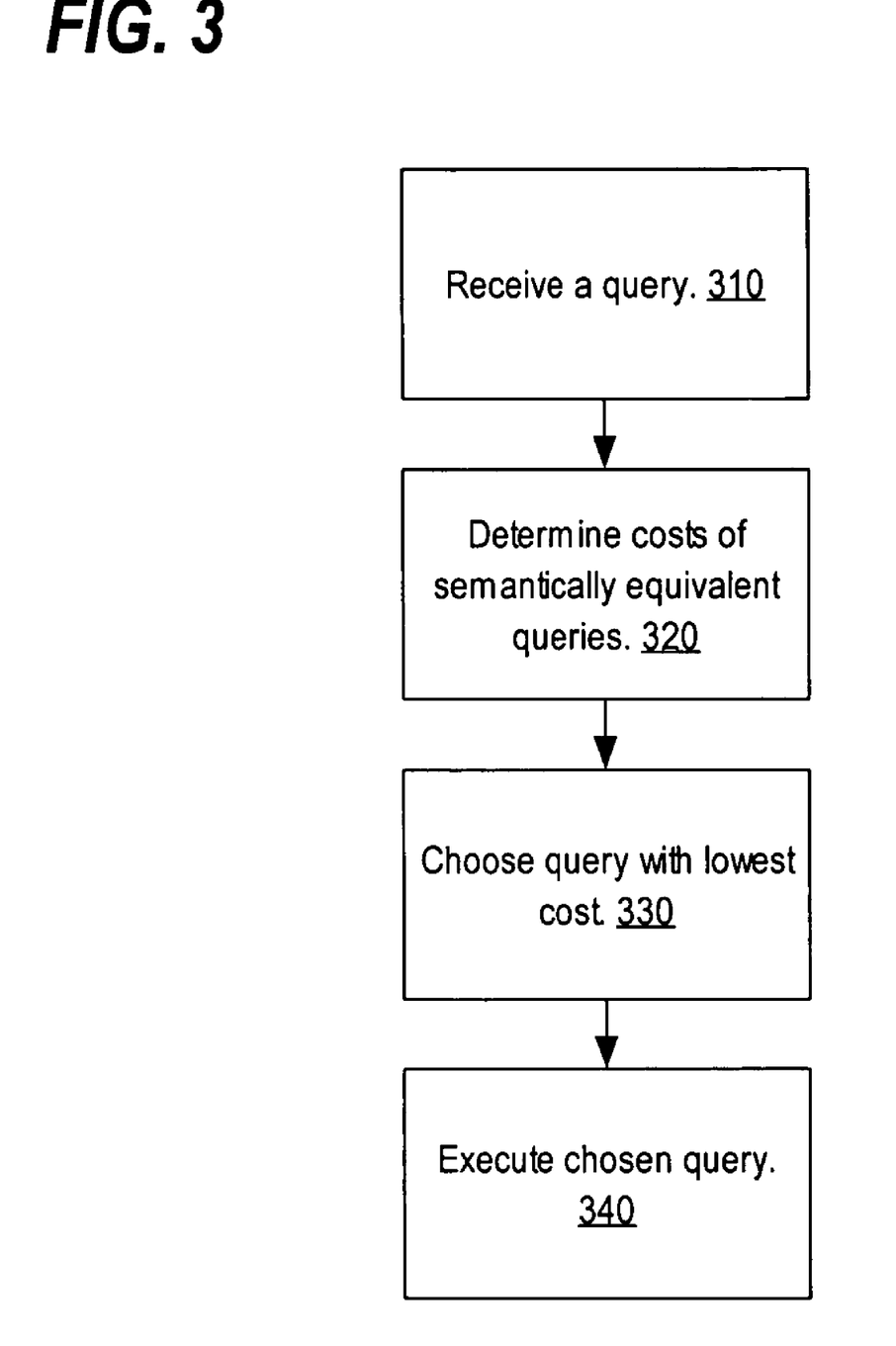
FIG. 3 is a flow diagram that depicts a process for determining query cost based on a subquery filtering factor.

FIG. 3 is a flow diagram that depicts a process for determining query cost based on a subquery filtering factor.

In step 310, the query processing unit 110 receives a query from a sender. The query may be received from any appropriate source. For example, a user may submit a query via operation of a client application 190 and the query processing unit 110 may receive the query from the client application 190. The query may include an outer query and one or more subqueries.

In step 320, the query processing unit 110 determines a cost for each of multiple semantically equivalent queries, which may include the originally received query. The techniques described with respect to FIG. 2 or those described in the section entitled Estimating Query and Query Block Cost may be used to determine the costs for the semantically equivalent queries. The choice of which semantically equivalent queries to use may be based in an exhaustive selection technique, a linear selection technique, or an iterative selection technique. The selection techniques are described in the section entitled Candidate Selection Techniques.

In step 330, the query processing unit 110 chooses the semantically equivalent query with the lowest cost, and in step 340, that query is executed. Since the choices of queries to be executed are all semantically equivalent, the same end result is produced, regardless of which semantically equivalent query is selected for execution. Therefore, since, in step 320, the query with the lowest cost was chosen, the chosen semantically equivalent query will efficiently produce the query results.

In the example herein, it is assumed that a lower cost is a "better" cost. In general, however, numerous possible methods for choosing a query based on cost may be used. Depending on implementation, one query among all of the semantically equivalent queries may be chosen based on either processing cost, temporal cost, or both. The cost function may be constructed such that either a high or low cost may be considered "better." As such a higher cost semantically equivalent query may be chosen in step 330. Various embodiments described with respect to FIG. 3 enable receiving a query determining costs for semantically equivalent queries and applying the lowest cost semantically equivalent query to the data.

Hardware Overview

Figure 4:
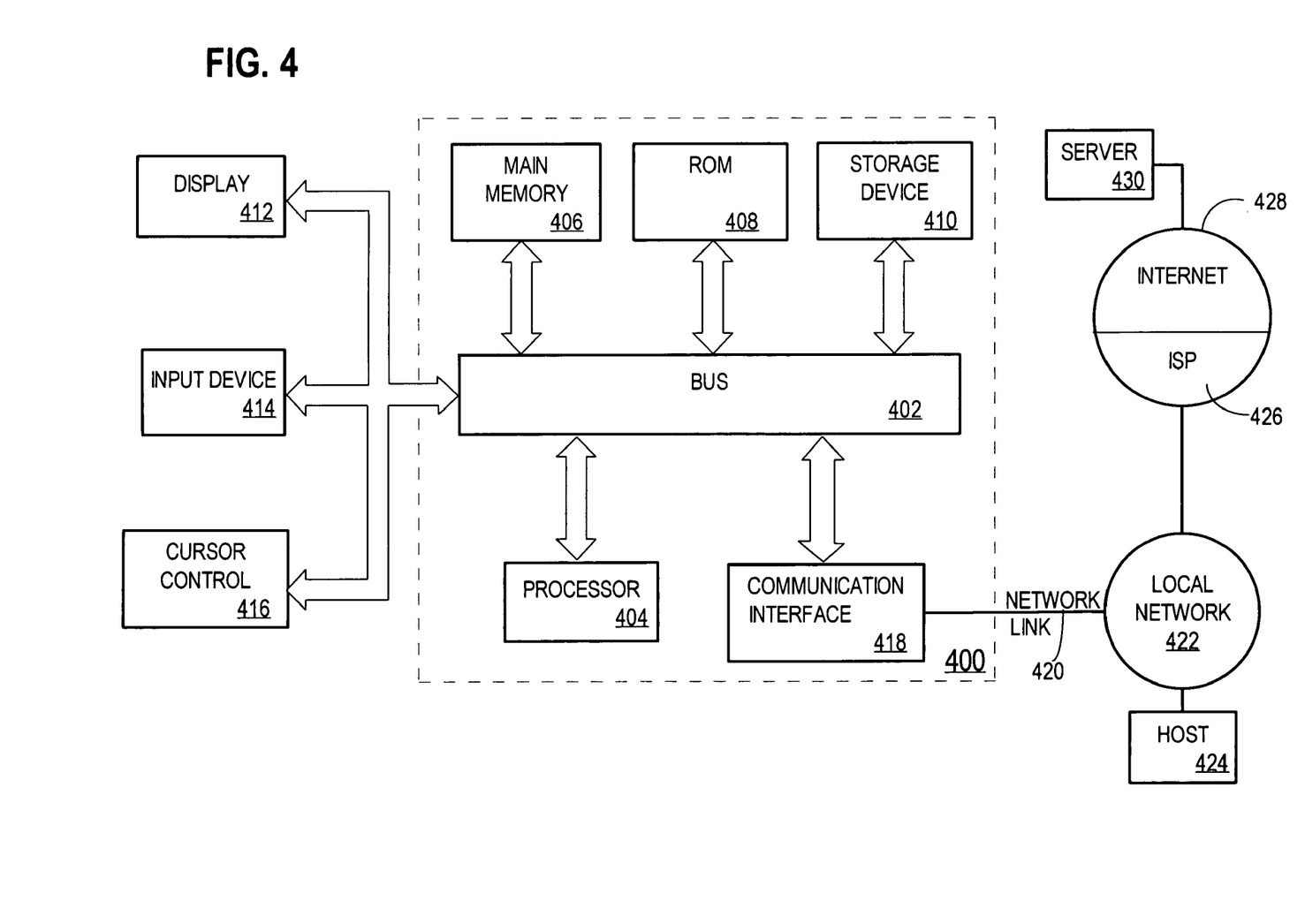
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of determining cost for a query that comprises an outer query and a first subquery, the method comprising the machine-implemented steps of:

determining a filtering factor for the first subquery based on a first cardinality and a second cardinality, wherein the first cardinality is determined based on a first set of query blocks in the query and wherein the second cardinality is determined based on a second set of query blocks, wherein the first set of query blocks comprises the outer query and zero or more subqueries from the query, and the first set of query blocks does not comprise the first subquery, and wherein the second set of query blocks comprises all query blocks in the first set of query blocks and, in addition, the first subquery; and determining a cost for the query based, at least, on the filtering factor for the first subquery.

2. The method of claim 1, wherein the first set of query blocks comprises the outer query and each of the zero or more subqueries in unnested form.

3. The method of claim 1, wherein the method further comprises:

determining the first cardinality based at least in part on the first set of query blocks.

4. The method of claim 1, wherein the method further comprises:

determining the second cardinality based on the second set of query blocks.

5. The method of claim 4, wherein the method further comprises:

performing an unnesting operation on the first subquery;
determining a second query based at least on the first set of query blocks and the unnesting operation; and
wherein the step of determining the second cardinality comprises determining a cardinality for the second query.

6. The method of claim 1, wherein the step of determining the filtering factor for the first subquery comprises determining a ratio of the second cardinality to the first cardinality.

7. The method of claim 1, wherein the query further comprises a particular subquery block, and the method further comprises:

determining a first cost associated with the first set of query blocks;
determining a second cost associated with the first subquery;
determining a third cost associated with the particular subquery block; and
wherein the step of determining the cost comprises determining the cost based on the first cost, the second cost, the third cost, the first cardinality, and the filtering factor for the first subquery.

8. The method of claim 7, wherein the step of determining the cost comprises summing the first cost; the product of the second cost and the first cardinality; and the product of the third cost, the first cardinality, and the filtering factor for the first subquery.

9. The method of claim 1, wherein the steps of determining the filtering factor and determining the cost are performed for each semantically equivalent query of two or more queries that are semantically equivalent to the query; and wherein the method further comprises:

choosing, as a particular query, a semantically equivalent query with the lowest cost from among the two or more queries that are semantically equivalent to the query.

10. The method of claim 9, wherein the method further comprises:

executing the particular query; and
providing the results of the executing step to a sender of the query.

11. The method of claim 9, wherein the two or more queries comprise all semantically equivalent queries that can be generated by a query-processing unit.

12. The method of claim 9, wherein the two or more queries comprise all candidate queries determined by a linear selection technique or an iterative selection technique.

13. A computer-readable volatile or non-volatile medium carrying one or more sequences of instructions which, executable by one or more processors, cause the one or more processors to perform the method recited in claim 1.

14. A computer-readable volatile or non-volatile medium carrying one or more sequences of instructions which, executable by one or more processors, cause the one or more processors to perform the method recited in claim 2.

15. A computer-readable volatile or non-volatile medium carrying one or more sequences of instructions which, executable by one or more processors, cause the one or more processors to perform the method recited in claim 3.

16. A computer-readable volatile or non-volatile medium carrying one or more sequences of instructions which, executable by one or more processors, cause the one or more processors to perform the method recited in claim 4.

17. A computer-readable volatile or non-volatile medium carrying one or more sequences of instructions which, executable by one or more processors, cause the one or more processors to perform the method recited in claim 5.

18. A computer-readable volatile or non-volatile medium carrying one or more sequences of instructions which, executable by one or more processors, cause the one or more processors to perform the method recited in claim 6.

19. A computer-readable volatile or non-volatile medium carry more sequences of instructions which, executable by one or more processors, cause the one or more processors to perform the method recited in claim 7.

20. A computer-readable volatile or non-volatile medium carrying one or more sequences of instructions which, executable by one or more processors, cause the one or more processors to perform the method recited in claim 8.

21. A computer-readable volatile or non-volatile medium carrying one or more sequences of instructions which, executable by one or more processors, causing the one or more processors to perform the method recited in claim 9.

22. A computer-readable volatile or non-volatile medium carrying one or more sequences of instructions which, executable by one or more processors, cause the one or more processors to perform the method recited in claim 10.

23. A computer-readable volatile or non-volatile medium carrying one or more sequences of instructions which, executable by one or more processors, cause the one or more processors to perform the method recited in claim 11.

24. A computer-readable volatile or non-volatile medium carrying one or more sequences of instructions which, executable by one or more processors, cause the one or more processors to perform the method recited in claim 12.

* * * * *

UNITED STATES PATENT AND TRADEMARK OFFICE
CERTIFICATE OF CORRECTION

| | |
|---|---|
| PATENT NO. | : 7,233,944 B2 |
| APPLICATION NO. | : 10/900788 |
| DATED | : June 19, 2007 |
| INVENTOR(S) | : Rafi Ahmed |

It is certified that error appears in the above-identified patent and that said Letters Patent is hereby corrected as shown below:

COLUMN 12

Claim 19: Line 34, delete "carry" and insert --carrying one or--.

Claim 21: Line 43, delete "causing" and insert --cause--.

Signed and Sealed this

Twenty-eighth Day of August, 2007

JON W. DUDAS
*Director of the United States Patent and Trademark Office*